Aug. 11, 1936.                F. REY                2,050,806
LOADER FOR REFUSE VEHICLES
Filed June 13, 1934          3 Sheets-Sheet 1
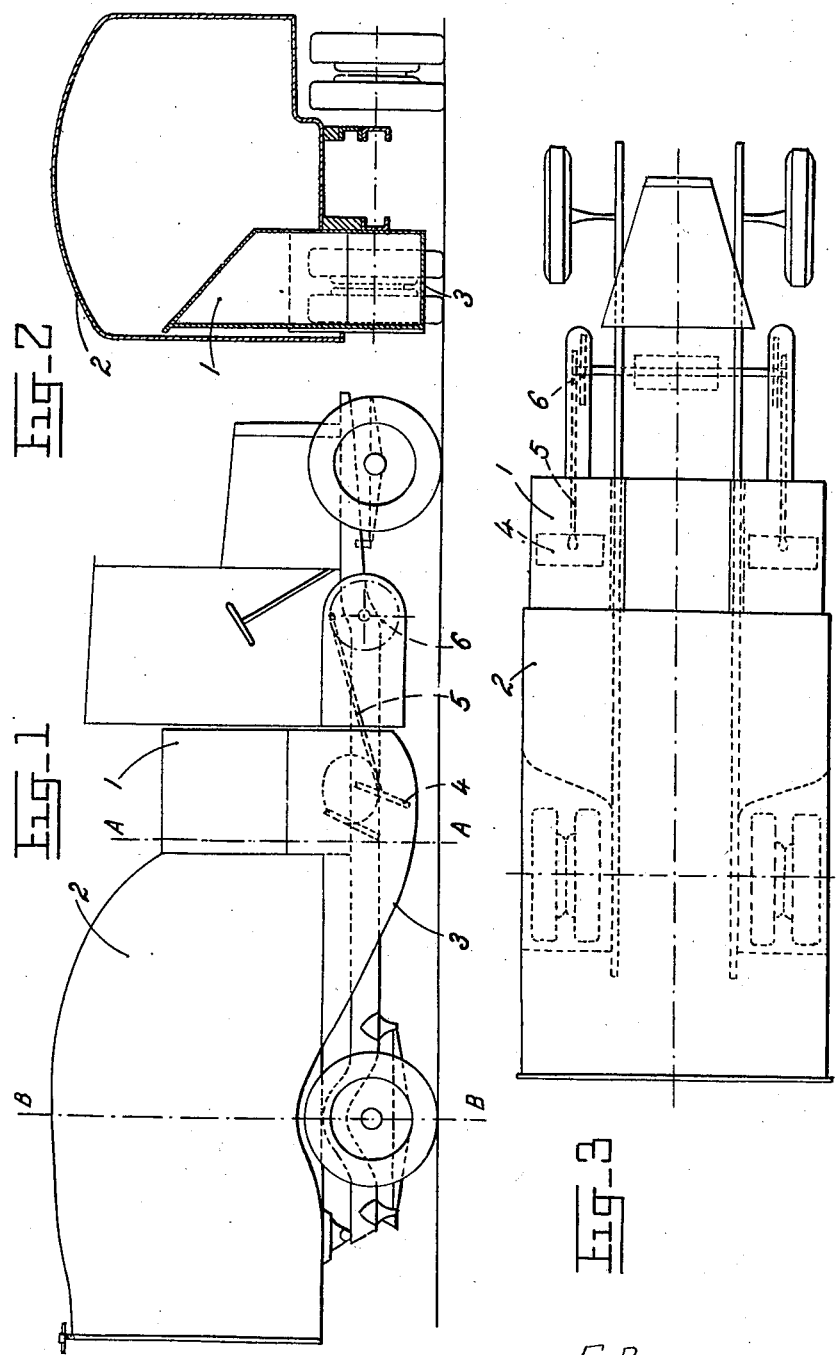
F. Rey
INVENTOR.
By Marks & Clerk
Attys.

Aug. 11, 1936.  F. REY  2,050,806
LOADER FOR REFUSE VEHICLES
Filed June 13, 1934  3 Sheets-Sheet 2
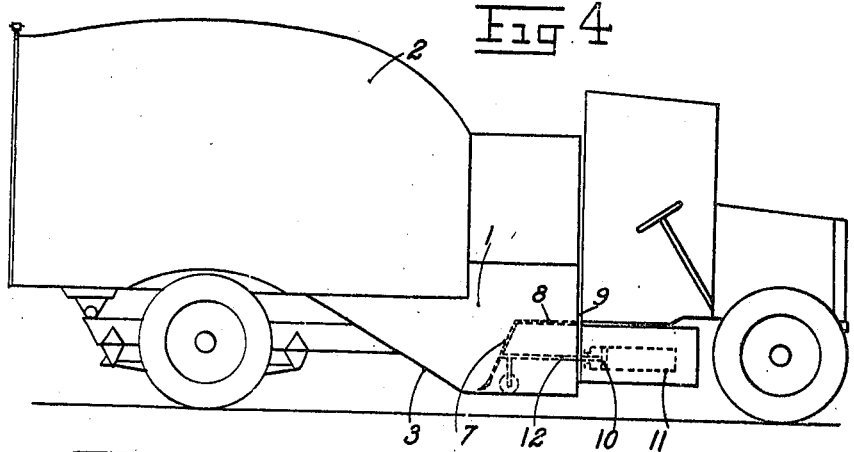
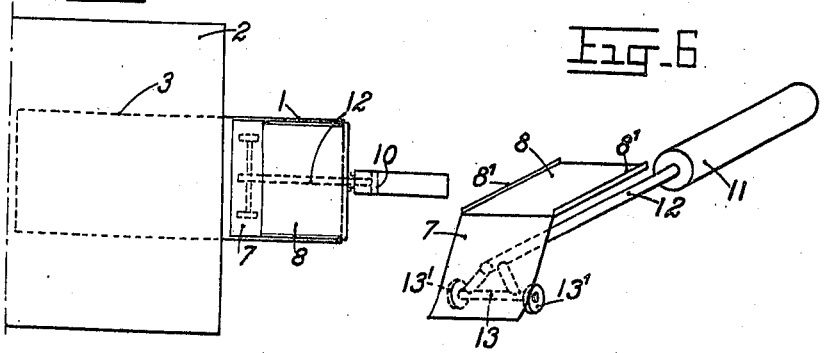
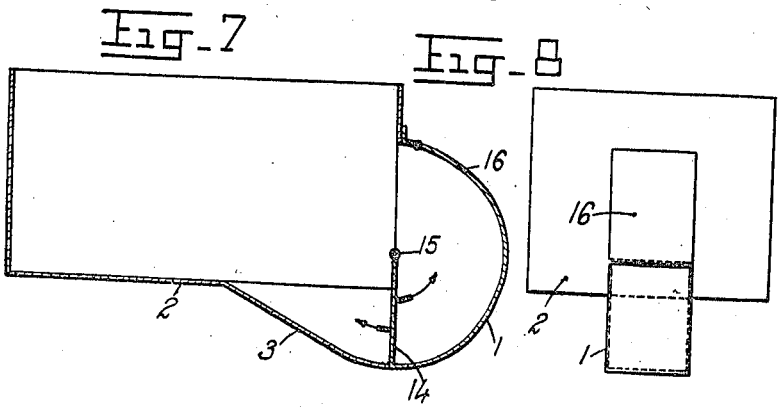
F. Rey
INVENTOR
By: Marks & Clerk
Attys.

Aug. 11, 1936.                F. REY                    2,050,806
                      LOADER FOR REFUSE VEHICLES
                        Filed June 13, 1934              3 Sheets-Sheet 3
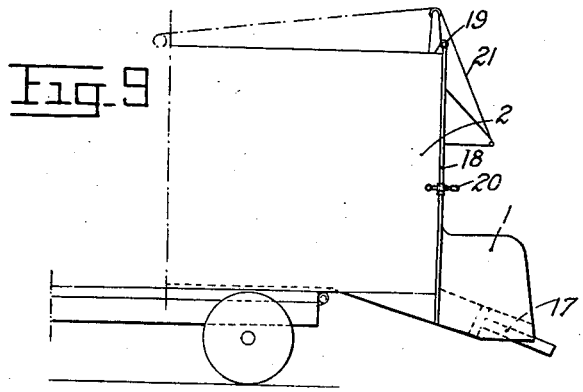
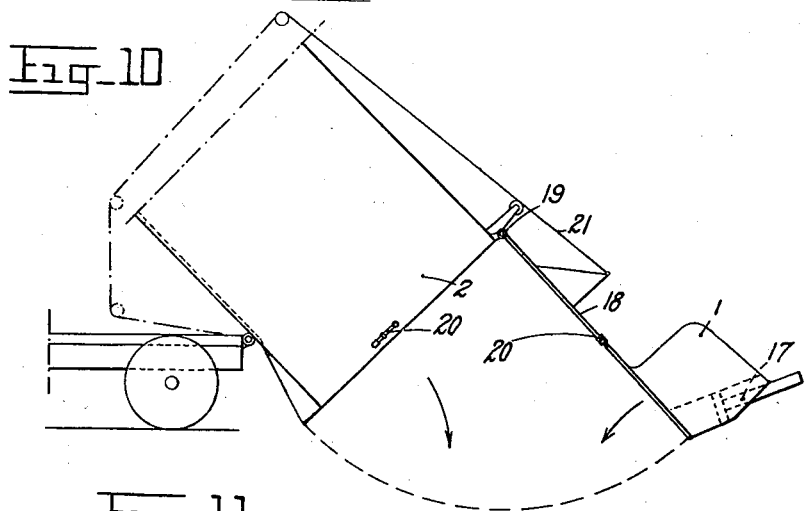
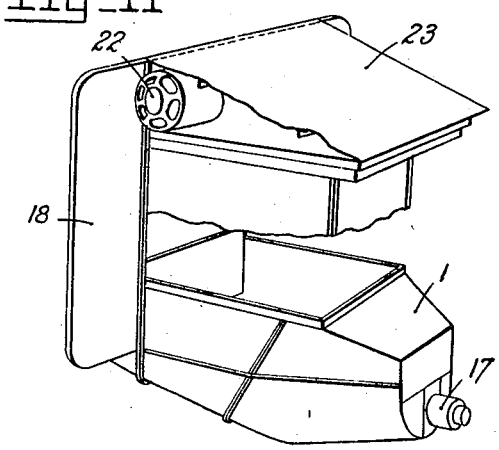
F. Rey
INVENTOR
Marks & Clerk
ATTYS.

Patented Aug. 11, 1936

2,050,806

UNITED STATES PATENT OFFICE 2,050,806

LOADER FOR REFUSE VEHICLES

Fernand Rey, Paris, France

Application June 13, 1934, Serial No. 730,487
In France June 27, 1933

5 Claims. (Cl. 214—67)

The present invention has for its object an apparatus for the loading of solid, pasty or semi-liquid material into a tank-body, closed or not, which is mounted on a movable chassis.

In the said apparatus, the material is poured into one or more hoppers or loading chambers. It is then taken up and delivered into the tank-body through one or more apertures provided in the latter, by means of a flat or curved member which is movable in the hopper or hoppers by the action of a suitable drive.

The loading hopper or hoppers may be placed in any position with reference to the tank-body, whether at the front, in the rear, at the sides, or below, according to circumstances.

The delivery apparatus, which is operated by suitable means, has an alternate, circular, elliptical or other movement, whether continuous or intermittent, according to the desired constructions and the requirements of the loading; the driving system works with whatever source of power.

The bottom of the hopper, whose form corresponds to the desired construction, is optically connected with the bottom of the tank-body by a suitable flat or curved member.

The tank-body is loaded by the direct propulsion or delivery of the mass of material into the interior of the tank-body, and the fresh material poured into the hopper will drive the rest of the material into the interior, and so on, until the tank-body is entirely filled, this latter containing no mechanical devices.

To facilitate the discharge, the hopper will usually have the lower position with reference to the tank-body. In this case, the hopper is connected with the tank-body by an inclined flat portion which forms a deflector and facilitates the upward filling of the material.

The apparatus according to the invention offers the following essential advantages:

1. The complete filling of the closed tank-body without any manual operations;
2. The loading is facilitated by reason of the reduced height of the edges of the loading hopper or hoppers;
3. All voluminous material may be considerably compressed, for instance household. In fact, the loaded material, by its reaction, tends to oppose the introduction of fresh material into the tank-body; as the pressure at any given point corresponds to the force required to displace the material, the user of the system can obtain the desired compression, and can greatly increase the amount of material, in the case of compressible material, which may be loaded into a tank-body of a given capacity;

4. The material is manipulated in an entirely closed tank-body, thus representing hygiene and cleanliness when loading and transporting fermentable material (household waste or the like), and the hoppers may be provided with automatic closing means, by which the apparatus is made entirely leak-proof;

5. There is no risk of accidents, and the loading staff is reduced in number.

The invention is particularly applicable for public administrations, for collecting and transporting household waste, as well as for loading and transporting material of various kinds, and chiefly for the departments of highways and for public works.

The accompanying drawings, which are given by way of example, represent various embodiments of the invention.

Figure 1 is an elevational view of a truck provided with a tank-body and with a loading apparatus in conformity with the invention. Figure 2 shows, on the left-hand side, a section on the line A—A of Figure 1, and on the right-hand side a section on the line B—B of Figure 1. Figure 3 is a plan view of the truck and body shown in Fig. 1. Figure 4 is a diagrammatic elevational view of a tank-body combined with a loading apparatus representing another embodiment of the invention. Figure 5 is a partial plan view corresponding to Figure 4, showing the loading apparatus located on the axis of the tank-body. Figure 6 is a perspective view of the delivery apparatus corresponding to Figures 4 and 5. Figure 7 is a longitudinal section of another form of construction, in which the loading is effected by a member having a suitable surface, which is rotatable about an axis, and Figure 8 is a corresponding elevational view. Figure 9 is a diagrammatic elevational view of the rear part of a tank-body in which the loading hopper and the delivery apparatus are mounted on the rear wall of the tank-body, which forms a discharge door, and Figure 10 is a like view showing the position of the tank-body and of the rear door during the discharge. Figure 11 is a partial perspective view of the rear part of the vehicle corresponding to Figures 9 and 10.

In the different forms of construction herein represented, 1 indicates the loading chamber or chambers, and 2 the tank-body into which is delivered the material received by the loading chamber or chambers.

In the form of construction represented in

Figures 1 to 3, the material is delivered into feeding conduits which connect the loading chambers 1 with the tank-body 2. The delivery devices consist of scraping plates 4, with or without teeth, actuated by driving links 5 connecting them with the driving device 6, operated by the car engine or by a special engine working under the action of any suitable source of power. The material to be loaded is poured, in any suitable way, into the loading chambers 1, and is then pushed by the said scrapers into the feeding conduits 3, thus supplying it to the tank-body 2. The said tank-body is discharged in any suitable manner, such as side-tipping, pouring from the rear by rotation on the ground or in a pit, or the like.

A similar arrangement is shown in Figures 4, 5 and 6, but the delivery apparatus comprises an impelling device 7 consisting of a flat or other member having an upper extension piece 8 which serves as a guide by its edges 8¹ and slidable in a front wall 9 pertaining to the general apparatus. In this construction, the said impelling device is actuated mechanically or by compressed air or oil acting upon a piston 10 which is movable in a cylinder 11 and is connected by a rod 12 with the impelling device 7, the rod 12 being protected against the dropping of the material placed in the loading chamber or chambers, by the part 8 of the said impelling device. The material poured into the loading chamber 1 is pushed by the plate 7 into the tank-body 2 until the latter is filled. In order to facilitate the movement of the impelling device, the rod 12 is supported by a carrying axle 13 having at its ends the rollers 13¹ adapted to roll at the end of the conduit 3.

It is obvious that instead of employing a central feeding conduit as shown in Figure 5, it is feasible to employ two lateral feeding conduits in symmetrical disposition.

In the form of construction shown in Figures 7 and 8, the material is delivered into the tank-body 2 by a plate 14 rotatable about a horizontal axis 15. For instance the said member 14 may consist of a plate which is movable in the loading chamber 1, and the material is delivered as in the aforesaid constructions. A door 16 provides for the pouring of the material into the loading chamber 1. This chamber is loaded when the movable plate 14 is in the upper position, and the downward rotation of the movable plate provides for the delivery of the material into the tank-body. Obviously, the construction shown in Figures 7 and 8 is subject to various modifications. Instead of loading the material from above or below, it may be loaded at the right or left, or on both sides.

In the form of construction represented in Figures 9 to 11, the loading hopper 1 and the delivery device 17 are mounted on the rear wall 18 of the tank-body 2 and at the exterior of this latter, and this rear wall forms a discharge door which is pivoted at the top on a horizontal axle 19 and is kept closed, during the loading, by fastening devices 20 by which the delivery device will bear against the door but without opening it.

For discharging purposes, the tank-body may be tilted to the rear, as shown in Figure 10, for instance about a fixed axle 25 mounted at its lower part. At the same time, the door 18 may be opened automatically by rotating it on the axle 19 by the action of suitable driving means such as cables 21, and during its rotation, the door may be guided by any suitable means. The material contained in the tank-body as well as the material in the loading hopper, will drop down, and is then evacuated. The discharge is thus effected by simply tilting the tank-body to the rear.

The delivery apparatus shown in Figures 9, 10, and 11 comprises a hydraulic piston operated by a pump which is driven by the electric motor 22, and the whole apparatus is mounted on the rear door 18. The loading hopper is preferably covered by a screen 23 adapted to shelter the men engaged with the loading.

I claim:

1. An apparatus for the loading of solid, pasty or semi-liquid material into a tank body mounted upon a movable chassis, comprising a loading chamber with its bottom in a lower position with respect to the bottom of said tank body, a movable member adapted to force upwardly said material from said chamber into said tank body, said movable member consisting of an inclined plate having a horizontal extension and flanges adapted to guide the motion of said movable member and means for moving said member.

2. An apparatus for loading solid, pasty or semi-liquid material into a tank body, comprising a receiving chamber which has four lateral walls and an inclined bottom, a pushing surface moving inside said receiving chamber, an aperture between said tank body and said receiving chamber and means for moving said pushing surface in such a manner as to maintain free a certain space between said pushing surface and the edges of said aperture, the inclined bottom of said receiving chamber being extended to constitute the bottom of said tank body and to form a guide for the pushing surface.

3. An apparatus for loading solid, pasty or semi-liquid material into a tank body, comprising a receiving chamber which has four lateral walls and an inclined bottom, a pushing surface adapted to move inside said receiving chamber, an aperture between said tank body and said receiving chamber and means for moving said pushing surface according to a reciprocating rectilinear motion and in such a manner as to maintain free a certain space between said pushing surface and the edges of said aperture, the inclined bottom of said receiving chamber being extended to constitute the bottom of said tank body and form a guide for said pushing surface.

4. An apparatus for loading solid, pasty or semi-liquid material into a tank body, comprising a receiving chamber which has four lateral walls and an inclined bottom, a pushing surface moving inside said receiving chamber, an aperture between said tank body and said receiving chamber and means for moving said pushing surface according to a rotative motion about a horizontal axis substantially in the plane of said pushing surface and in such a manner as to maintain free a certain space between said pushing surface and the edges of said aperture, the inclined bottom of said receiving chamber being extended to constitute the bottom of said tank body and to form a guide for said pushing surface.

5. A tank body for receiving solid, pasty or semi-liquid material having two loading apparatus as claimed in claim 2.

FERNAND REY.